(12) United States Patent
Handte et al.

(10) Patent No.: US 10,913,024 B2
(45) Date of Patent: Feb. 9, 2021

(54) FILTER CARTRIDGE COMPRISING A FLOW GUIDING DEVICE PROTRUDING FROM A FILTER ELEMENT, FILTER SYSTEM AND METHOD FOR CLEANING A FILTER CARTRIDGE

(71) Applicant: Camfil APC GmbH, Tuttlingen (DE)

(72) Inventors: Jakob Handte, Tuttlingen (DE); Dominick Bisogni, Tuttlingen (DE); Randilyne Huckaby, Tuttlingen (DE); Ryan Listenbee, Tuttlingen (DE); Adam Simino, Tuttlingen (DE); Alex Wells, Tuttlingen (DE); Daniel Vangilder, Tuttlingen (DE)

(73) Assignee: CAMFIL APC GMBH, Tuttlingen (DE)

( * ) Notice: Subject to any disclaimer, the term of this patent is extended or adjusted under 35 U.S.C. 154(b) by 220 days.

(21) Appl. No.: 16/058,013

(22) Filed: Aug. 8, 2018

(65) Prior Publication Data

US 2019/0247776 A1    Aug. 15, 2019

(30) Foreign Application Priority Data

Feb. 13, 2018    (DE) .................. 10 2018 103 154

(51) Int. Cl.
*B01D 46/00*    (2006.01)
*B01D 46/24*    (2006.01)

(52) U.S. Cl.
CPC ..... *B01D 46/0071* (2013.01); *B01D 46/0021* (2013.01); *B01D 46/0043* (2013.01);
(Continued)

(58) Field of Classification Search
CPC ............ B01D 46/0021; B01D 46/2403; B01D 46/2414; B01D 46/0043; B01D 46/0067; B01D 46/0068; B01D 46/0071
See application file for complete search history.

(56) References Cited

FOREIGN PATENT DOCUMENTS

DE          255673 A1    4/1988
DE      42 42 991 A1    6/1994
(Continued)

OTHER PUBLICATIONS

DE Search Report, DE 10 2018 103 154.8, dated Aug. 30, 2018 (in English) (6 pp.).

(Continued)

*Primary Examiner* — Robert Clemente
(74) *Attorney, Agent, or Firm* — Eversheds Sutherland (US) LLP

(57) ABSTRACT

The disclosure relates to a filter cartridge for removing impurities from a stream of raw gas to be filtered, including a cylindrical filter element which is made of a filter material and in which a filter insert is inserted, an interior space being formed between the filter element and the filter insert, the filter material being designed to be cleaned when a stream of compressed air is applied against a flow direction of the stream of raw gas, a cap designed as a flow guiding device being provided for guiding the stream of compressed air, wherein the cap is arranged such that it projects beyond an axial length of the filter element in the axial direction. The disclosure further concerns a filter system for removing impurities from a stream of raw gas to be filtered. In addition, the disclosure relates to a method for cleaning such a filter cartridge.

12 Claims, 4 Drawing Sheets

(52) U.S. Cl.
CPC ..... *B01D 46/0068* (2013.01); *B01D 46/2403* (2013.01); *B01D 46/2414* (2013.01)

(56) References Cited

FOREIGN PATENT DOCUMENTS

| KR | 20130097956 A | 9/2013 |
|----|---------------|--------|
| WO | 9603195 A1 | 2/1996 |
| WO | 9834713 A1 | 8/1998 |

OTHER PUBLICATIONS

DE Search Report, DE 10 2018 103 154.8, dated Aug. 30, 2018 (in German) (7 pp.).
EP Search Report, EP 19156729.6-1104, dated May 20, 2019 (in German) (8 pp.).
EP Search Report, EP 19156729.6-1104, dated May 20, 2019 (in English) (4 pp.).

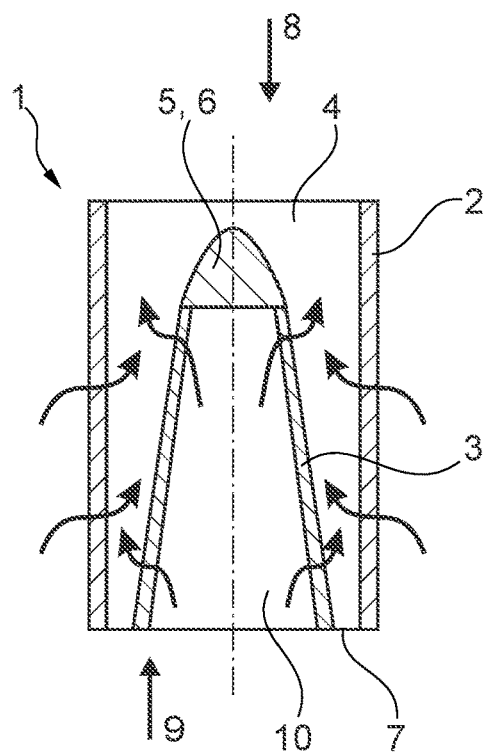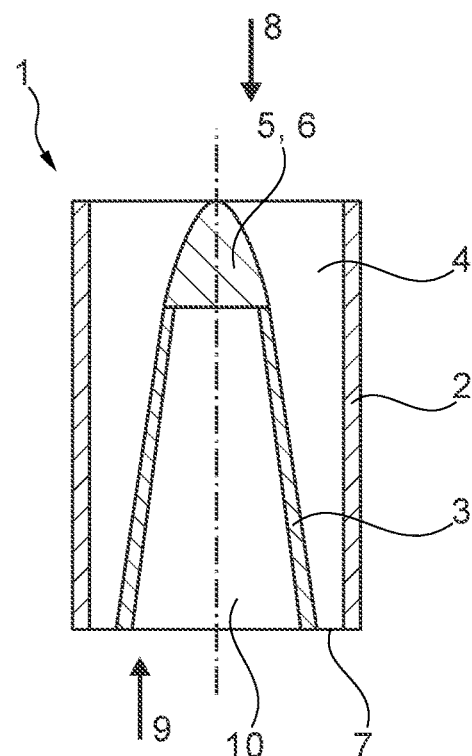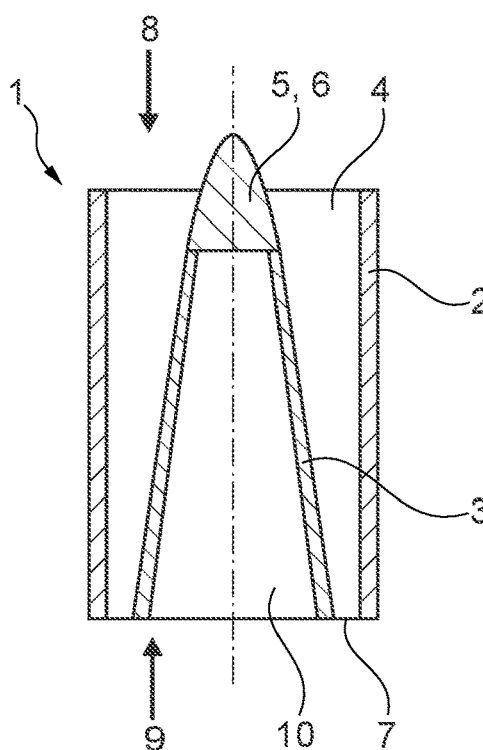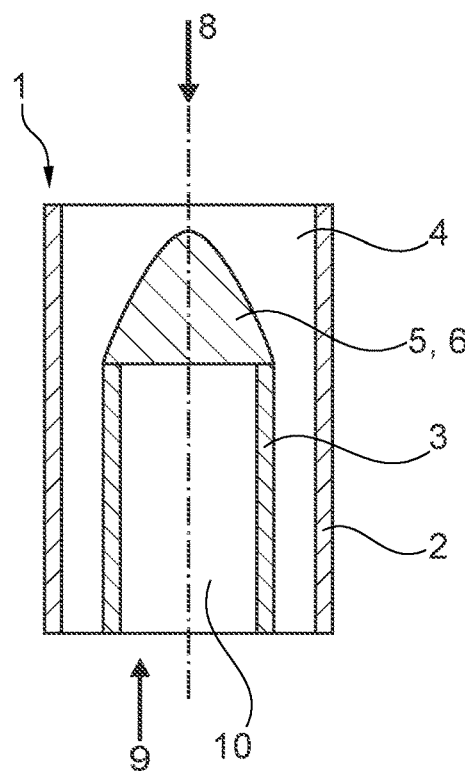

FILTER CARTRIDGE COMPRISING A FLOW GUIDING DEVICE PROTRUDING FROM A FILTER ELEMENT, FILTER SYSTEM AND METHOD FOR CLEANING A FILTER CARTRIDGE

TECHNICAL FIELD

The invention relates to a filter cartridge for removing impurities from a stream of raw gas to be filtered, comprising a cylindrical filter element which is made of a filter material and in which a filter insert is inserted which is made for instance from a filter material or a material impermeable to air, an annular interior space being formed between the filter element and the filter insert, the filter material being designed to be cleaned when a stream of compressed air is applied against a flow direction of the stream of raw gas, a cap designed as a flow guiding device being provided for guiding the stream of compressed air. The invention further concerns a filter system for removing impurities from a stream of raw gas to be filtered, comprising a housing in which at least one such filter cartridge is arranged, and a compressed air tank which comprises at least one nozzle and is designed to eject the stream of compressed air from the nozzle for impinging the filter material. In addition, the invention relates to a method for cleaning such a filter cartridge, preferably in such a filter system, wherein a stream of compressed air is ejected from a nozzle which then flows against the cap of the filter cartridge and is expanded by the outer shape of the cap such that it hits the entire filter material of the filter element.

BACKGROUND OF THE INVENTION

Filter cartridges are already known from the state of the art. For example, U.S. Pat. No. 5,972,059 discloses an air filter assembly having a cylindrical air filter element, comprising a base element having an opening formed therein, an upper element having an opening formed therein, the opening of the upper element being disposed opposite the one end of the cylindrical air filter element, wherein the opening of the base element is disposed opposite the other end of the cylindrical air filter element, having an elongated conical filter element comprising a head portion, with the longitudinally outer wall of the conical filter element extending opposite most of the longitudinally inner wall of the cylindrical filter element, the opening of the base element being located opposite the base portion of the conical filter element, and means for securing the head portion of the conical filter element to the inner wall of the cylindrical filter element, wherein air to be filtered is conducted into the interior space of the conical filter element through the base portion thereof, the air flowing through the walls of the conical filter element and into the space between the outer wall of the conical filter element and the inner wall of the conical filter element, wherein the air to be purified further flows through the walls of the cylindrical filter element into the space between the outer wall of the conical filter element and the inner wall of the cylindrical filter element, and wherein the air in the space is clean air flowing out through the opening in the upper element. A filter cartridge is thus disclosed, in which the air to be cleaned is guided inwards through the outer wall of the cylindrical element and outwards through the inner wall of the conical filter element, in each case into the interior space between the conical filter element and the cylindrical filter element, and is cleaned in this way.

However, the state of the art always has the disadvantage that such a filter cartridge has to be cleaned in order to extend the service life of the filter cartridge. For removing the dust from the filter material of the filter cartridge, a stream of compressed air directed against the direction of flow of the air to be cleaned is usually applied to the filter cartridge. This causes the dust and impurities that accumulate in the filter material to fall off the filter cartridge in the direction of gravity. However, the disadvantage of cleaning a filter cartridge as disclosed in said US patent application is that the filter material is removed from the filter cartridge only unevenly, so that the cleaning performance of the filter cartridge decreases considerably over time or the cartridge has to be cleaned more frequently or with a higher air pressure, which in turn has a negative effect on the service life of the filter cartridge. In particular, the upper part of the filter cartridge is usually only insufficiently cleaned. In addition, the filter cartridge and a source providing the stream of compressed air must be arranged so far spaced apart from each other that the stream of compressed air can expand to such an extent that it can hit the filter material of the filter element. However, this means that the filter system requires a relatively large axial installation space. In particular, it is often not possible to make provision for a sufficiently large distance between a nozzle that ejects the stream of compressed air and a filter cartridge inlet, which has to be relatively large due to the small opening angle with a free jet.

SUMMARY OF THE INVENTION

It is therefore the object of the invention to avoid or at least alleviate the disadvantages arising from the state of the art. In particular, a filter cartridge is to be provided for installation in a filter system, with which a particularly compact design of the filter system can be realized while offering an improved cleaning effect at the same time. In particular, a filter cartridge is to be provided which is constructed in such a way that it can be cleaned particularly well of dust and impurities, with low consumption of compressed air at the same time. Usually, the intensity of the stream of compressed air used for cleaning is increased by increasing the primary pressure in the pressure tank in order to improve the cleaning result. However, this means a higher stress on the filter cartridge, which considerably reduces the durability and service life of the filter cartridge. In particular, a filter cartridge is to be provided which can be cleaned particularly evenly across its entire filter surface even at a lower primary pressure in the pressure tank.

The object of the invention is achieved in a generic device in that the cap is arranged such that it protrudes beyond an axial length of the filter element in the axial direction. This means that the cap protrudes from the filter element in the axial direction. This has the advantage that the stream of compressed air can be expanded to the desired annular cross-section—or to the desired inner diameter of the filter cartridge which is to be acted upon with compressed air—already before reaching the filter element, so that the axial distance between a source for providing the stream of compressed air and the filter cartridge can be reduced, which has a favorable effect on the required axial installation space of the entire filter system. In addition, the "earlier expansion" in the axial direction offers design freedom with regard to the external shape of the cap, so that the stream of compressed air must be expanded more slowly, i.e. less strongly, which has advantages in terms of reducing the energy loss during expansion.

Advantageous embodiments are claimed in the subclaims and will be explained in more detail below.

In the following, a direction parallel to a central axis of the filter cartridge (or of the filter element or filter insert or cap) is referred to as an axial direction. In the following, a direction that represents an axial direction and in which the stream of compressed air flows is referred to as a first axial direction. A direction opposite the first axial direction is called a second axial direction. Thus, the stream of raw gas flows into the filter cartridge in the second axial direction, while the stream of compressed air flows into the filter cartridge in the first axial direction.

In the following, the one axial end of the filter cartridge (or of the filter element or filter insert or cap) facing the first axial direction is referred to as a first axial end, and the other axial end of the filter cartridge (or of the filter element or filter insert or cap) facing the second axial direction is referred to as a second axial end.

It is also advisable to place a first axial end of the cap outside the filter element in the axial direction. This is an advantageous way to ensure that the stream of compressed air is already expanded to the desired diameter when the filter element is reached, so that even a portion of the filter element at a first axial end, i.e. at an end facing the stream of compressed air, can be hit by the stream of compressed air and thus sufficiently cleaned.

It is also advantageous if an outer diameter of the cap increases from the first axial end of the cap to a second axial end of the cap opposite the first axial end of the cap. This means that the outer diameter of the cap is smallest at the first axial end as seen over an axial length of the cap, and the outer diameter of the cap is largest at the second axial end as seen over an axial length of the cap. Since the flow of compressed air first hits the cap at the first axial end of the cap, the flow of compressed air is directed radially outwards through the widening outer shape of the cap and thus expanded. The direction in which or the flow path on which the flow of compressed air is directed is controlled by a gradient or a curvature of the outside diameter widening.

Furthermore, it is preferred if the second axial end of the cap is arranged in the axial direction inside the filter element or at the beginning of the filter element. This has the advantage of ensuring that the stream of compressed air that flows along the outer shape of the cap flows into the interior space of the filter cartridge and hits the walls of the filter cartridge from there.

Another beneficial exemplary embodiment is distinguished in that the cap has two portions, with a first portion of the cap being arranged outside the filter element in the axial direction and a second portion of the cap being arranged inside the filter element. This means that the first portion of the cap is that portion of the cap that protrudes from the filter element in the axial direction, whereas the second portion of the cap is that portion of the cap that is arranged in the axial direction within the filter element, i.e. at the same axial height as the filter element. In other words, the cap is located partially inside the interior space of the filter cartridge and partially outside the interior space of the filter cartridge. This allows the stream of compressed air to be directed particularly advantageously to the walls of the filter cartridge, i.e. to the filter material of the filter element and to the filter material of the filter insert. At the same time, the distance between the compressed air source and the filter cartridge can be considerably reduced in contrast to a filter cartridge in which the cap is arranged completely inside the filter element, i.e. completely in the interior space.

In addition, it is advantageous if the first portion of the cap and the second portion of the cap are integral, i.e. made in one piece. This reduces the production costs of the cap, on the one hand, and simplifies the assembly process on the other hand, as the two portions do not have to be aligned and mounted to each other. In addition, a particularly smooth, i.e. seamless/stepless transition between the two portions can be achieved in this way.

Furthermore, it is also possible if the first portion of the cap and the second portion of the cap are designed to be separate, i.e. as separate components. This allows the two portions to be mounted separately from each other, e.g. one portion on a housing-fixed component and the other portion on the filter cartridge, so that the complete cap is formed not until the filter cartridge is inserted into the filter system. This makes it easier to replace the filter cartridge.

It is also advisable for the first portion of the cap to have an axial length in the axial direction that is 0.5 to 1.0 times the internal diameter of the filter element. In this way, particularly favorable flow control properties can be achieved, in particular a reduction in the energy loss of the stream of compressed air, as the stream of compressed air can be expanded relatively gently. In addition, the axial projection of the filter cartridge is kept to a suitable dimension so that it is possible to replace the filter cartridge.

In addition, a beneficial exemplary embodiment is distinguished in that the first portion of the cap has a greater axial length than the second portion of the cap. This means that a larger part of the cap is arranged outside the filter element with respect to the axial extension. Especially with filter cartridges with a large inner diameter an optimized cleaning result can be achieved in this way.

It is also advantageous if the cap is arranged completely outside the filter element, i.e. not inside the filter element in the axial direction, i.e. not at the same axial height as the filter element. This allows the entire length of the filter element to be cleaned in an advantageous manner, because the stream of compressed air is already expanded to the diameter of the filter element when entering the filter cartridge.

However, in an alternative embodiment it is also possible that the first portion of the cap has a smaller axial length than the second portion of the cap. This means that a larger part of the cap is arranged inside the filter element with respect to the axial extension. Especially with filter cartridges with relatively small axial extension, this can improve the cleaning result.

The object of the invention is also achieved by a filter system for removing impurities from a stream of raw gas to be filtered, comprising a housing in which at least one such filter cartridge is arranged, and a compressed air tank which has at least one nozzle and is designed to eject the stream of compressed air from the nozzle for impinging on the filter material. In the filter system according to the invention, several filter cartridges according to the invention are preferably arranged which, for cleaning the filter material, can be acted upon by a stream of compressed air in the manner of a compressed air blast from one nozzle each, which is arranged coaxially to the filter cartridge but at a distance in the axial direction. By placing the cap into the filter cartridge, the distance between the nozzle and the filter cartridge can be reduced, as the stream of compressed air, which emerges from the nozzle as a free jet with an opening angle of about 12°, is additionally expanded by the cap. As a result, the stream of compressed air is expanded even at a reduced distance such that the inner diameter of the filter cartridge is reached. Furthermore, the flow around the inflow-side head of the filter insert occurs with low energy loss.

It is also preferred if a distance between the filter element and the nozzle is smaller than 2.0 times, preferably smaller than 1.8 times, further preferred smaller than 1.5 times, also preferred smaller than 1.0 times, also preferably smaller than 0.5 times the size of the inner diameter of the filter element. This makes the filter system particularly compact in axial direction.

It is also advantageous if an outer shape of the cap is matched both to the distance between the cap and the nozzle and to the inner diameter of the filter element, so that the stream of compressed air is expanded such that the filter material of the filter element is hit by the stream of compressed air. By selecting an appropriate outer shape of the cap, the energy loss of the stream of compressed air when hitting the cap can be reduced, preferably minimized.

The object of the invention is also achieved by a process for cleaning such a filter cartridge, preferably in such a filter system, wherein a stream of compressed air is ejected from a nozzle and then flows against the cap of the filter cartridge and is widened by the outer shape of the cap such that it hits the entire filter material of the filter element.

According to another aspect of the invention, which is independent of the above embodiments, but which can preferably also be combined with features of the above embodiments, the invention concerns a filter cartridge for removing impurities from a stream of raw gas to be filtered, comprising a cylindrical filter element which is made of a filter material and in which a filter insert, for example made of filter material or an air-impermeable material, is inserted, wherein between the filter element and the filter insert, i.e. inside the filter cartridge, a preferably annular interior space is formed, with the filter material being designed to be cleaned when subjected to a stream of compressed air against a flow direction of the stream of raw gas, a cap being provided which is formed as a flow guiding device and is arranged and designed with respect to its outer shape such that the stream of compressed air is expanded through the cap in such a manner that the entire filter material of the filter element is hit by the stream of compressed air and a resulting energy loss is kept small. The advantage of this is that the stream of compressed air is guided in such a way, on the one hand, that the entire filter material or at least the entire filter material of the cylindrical filter element is hit by the stream of compressed air and not only a lower part of the filter element. On the other hand, the suitable design of the outer shape of the cap ensures that the energy of the stream of compressed air is reduced during its expansion only minimally, i.e. as far as necessary. With a filter cartridge according to the invention, both the service life of the cartridge can be extended by the fact that the filter cartridge can be cleaned more gently due to the improved cleaning result and must be cleaned less frequently, and by the fact that compressed air can be saved, so that the costs of cleaning can be considerably reduced.

It is also advisable if the energy loss is less than 40%, preferably less than 20%, and more preferably less than 10%. The difference in energy is measured between the point at which the flow of compressed air hits the cap, i.e. a first axial end of the cap, and the point at which the flow of compressed air hits the end of the filter element furthest from the cap. This ensures that sufficient energy arrives with the stream of compressed air even at the end of the filter element further away from the compressed air source to achieve a sufficient cleaning result.

In the following, a direction parallel to a central axis of the filter cartridge (or of the filter element or filter insert or cap) is referred to as an axial direction. In the following, a direction that is an axial direction and in which the stream of compressed air flows is referred to as a first axial direction. A direction opposite the first axial direction is called a second axial direction. Thus, the stream of raw gas flows into the filter cartridge in the second axial direction, whereas the stream of compressed air flows into the filter cartridge in the first axial direction.

In the following, the one axial end of the filter cartridge (or of the filter element or filter insert or cap) facing the first axial direction is referred to as a first axial end, and the other axial end of the filter cartridge (or of the filter element or filter insert or cap) facing the second axial direction is referred to as a second axial end.

It is also advantageous if the cap is arranged at least partially in the interior space of the filter cartridge. This prevents the axial length of the filter cartridge being increased by the cap.

It is also advantageous if the interior space of the filter cartridge has a constant annular cross-section as seen over the axial length of the filter insert and/or the filter element, at least in portions. Firstly, the volume of the interior space can be minimized compared to an interior space with a non-constant annular cross-section, which is achieved, for example, with a conical filter insert, so that it is easier to generate a higher pressure in the interior space of the filter cartridge. At the same time, the filter surface of the filter cartridge can be increased.

It is also advantageous if the interior space has a constant annular cross-section over the entire axial length of the filter insert and/or filter element. This also improves the cleaning result, as the cross-section remains the same and the stream of compressed air does not have to be expanded further over the axial length of the filter insert, which prevents additional energy loss of the stream of compressed air.

A favorable exemplary embodiment is distinguished in that the filter insert has a cylindrical outer diameter. On the one hand, the advantages mentioned above can be achieved, and on the other hand, the design of the filter cartridge is considerably simplified.

In addition, it is preferred if the outer shape of the cap is designed so as to be convex, preferably strictly convex. This means that the cap bulges towards the stream of compressed air. This also means that the cap curves outwards or is curved outwards as seen from the filter insert. This results in a particularly favorable flow diversion when the stream of compressed air hits the outer shape of the cap. In particular, the design is preferred with regard to minimizing energy loss and expanding the stream of compressed air to the desired diameter of the interior space.

It is also advantageous if the cap is arranged at an axial end of the filter insert. It is also particularly preferred if the cap is attached to the filter insert, especially to an axial end face of the filter insert. It is in particular preferred if a cross-section of the cap merges into a cross-section of the filter insert, i.e. that an outer diameter of the cap corresponds to an outer diameter of the filter insert at the point where the cap adjoins the filter insert. This also means that the outer diameter of the cap at the second axial end of the cap corresponds to the outer diameter of the filter insert at the first axial end of the filter insert. This has the advantage that the stream of compressed air can flow along the cap and then along the outside of the filter insert.

A favorable exemplary embodiment is therefore distinguished in that an outer diameter at one end of the cap facing the filter insert, i.e. at the second axial end of the cap, essentially corresponds to the outer diameter at an end of the filter insert facing the cap, i.e. at the first axial end of the filter insert. The outer shape of the cap thus merges "seamlessly" into the filter insert.

It is also advantageous if the cap and the filter cartridge and/or the filter element and/or the filter insert are arranged coaxially. This allows an even flow of compressed air to be achieved.

Furthermore, it is preferred if the cap is made of a solid material or like a sheath/shell, depending on weight or rigidity requirements.

In particular, it is advantageous if the outer shape of the cap follows a parabolic function or a root function. This means that an outer contour of the cap follows a root function from a first axial end of the cap, at which the curvature of the cap is greatest, to its second axial end, which is opposite the first axial end in the axial direction. This also means that the cap is rotationally symmetrical, whereby the cap is formed by rotation of a parabola around its longitudinal axis. This also means that each longitudinal cross-section of the cap is parabolic. It further means that each cross-section of the cap is circular.

Furthermore, the cap is advantageously designed such that a gradient of the parabola following the outer shape of the cap decreases in the axial direction from the first axial end. This means that the outer diameter of the cap increases in the axial direction from the first axial end of the cap, where the curvature of the cap is greatest, to its other axial end, i.e. the second axial end, but increases less in the outer diameter with increasing axial length.

It could also be stated that the outer shape of the cap is designed such that its shape corresponds to the tip of a supersonic aircraft. The cap thus has an egg-shaped tip. In other words, the first axial end of the cap is blunt, i.e. not pointed.

It is also useful if the outer shape of the cap follows the function $f(x)=x^{1/2}$ (in words: x to the power of a half). If the cap is designed with such an outer shape, particularly favorable flow conditions are created, which is optimized in particular for an inflow at high speeds.

It is also advantageous if the outer shape of the cap is matched to an outer diameter of the interior space of the filter cartridge in such a way that the stream of compressed air is expanded up to the filter material of the filter element. This directs the stream of compressed air to where it cleans the filter material by flowing through the filter material of the filter element from the inside to the outside, i.e. against the direction of the stream of raw gas.

Furthermore, it is preferred if an axial length of the cap is 0.5 to 2 times as large as an outer diameter of the interior space of the filter cartridge. Further preferred, the axial length of the cap is 1.5 to 1.0 times the size of the outer diameter of the interior space of the filter cartridge. This achieves a suitable compromise/trade-off between the expansion of the stream of compressed air and the energy loss of the stream of compressed air when it hits the cap.

In addition, it is preferred if the outer shape of the cap is designed for being hit by a flow with high velocity to supersonic velocity. This means that the outer shape of the cap is designed in such a way that when it comes into contact with the flow, i.e. when it is hit by a flow propagating at high speed up to supersonic speed, it realizes the desired expansion and at the same time minimizes the resulting energy loss. Such an outer form is already used in other fields of application, for example in the field of aircraft noses.

It is also useful if an annular component is arranged at the second axial end of the filter cartridge, which connects the filter element at the second axial end to the filter insert at the second axial end. This prevents the filtered raw gas from the interior space from mixing with the unfiltered raw gas outside the filter cartridge. At the same time, this gives the filter cartridge stability.

The annular component serves as a filter bottom and is designed to be impermeable to air, so that it gives the filter cartridge additional stability, as a stronger material can be used. In particular, the filter insert and the filter element are placed in a pan which is filled with cast material, e.g. resin, and are connected in a sealed manner.

It is also useful if there is an opening at a first axial end of the filter cartridge from which the cleaned air can flow out advantageously. In other words, the first axial end is that end of the filter cartridge from which the filtered stream of raw gas, i.e. the clean gas flow exits. The second axial end of the filter cartridge is closed, i.e. the air outside the filter cartridge cannot mix with the air inside the filter cartridge. The air can only enter the interior space of the filter cartridge through the filter material.

In particular, it is preferred if the opening is circular. A preferred exemplary embodiment is also distinguished in that the opening merges into the interior space of the filter cartridge between the filter insert and the filter element. In the axial direction starting from the first axial end of the filter cartridge to the first axial end of the cap, the filter cartridge has a circular cross-section. Through the cap and the filter insert, which adjoins the cap in the axial direction, the interior space of the filter cartridge has an annular cross-section from the first axial end of the cap to the second axial end of the filter cartridge. The cap is thus designed in such a way that the stream of compressed air is guided gently, i.e. with minimized energy loss, from the circular cross-section into the annular cross-section, i.e. is widened along the outer shape of the cap.

In the course of a filter operation in which the stream of raw gas to be filtered flows through the filter material, the filter cartridge is operated such that the flow is directed from its second axial end towards its first axial end. This means that the stream of raw gas is led through the filter element, especially the filter material of the filter element, from the outside to the inside. This also means that the stream of raw gas, when the filter insert is made of filter material, is led through the filter insert, especially the filter material of the filter insert, from the inside to the outside into the inner region. However, it is also possible to form the filter insert from an air-impermeable material or a material which does not allow any flow through it, so that the filter insert functions as a displacement body that improves the cleaning result.

In addition, the filter cartridge in a preferred exemplary embodiment is designed such that the stream of raw gas emerges from the filter material as a clean gas flow. This means that the entire interior space of the filter cartridge forms a clean gas chamber which is surrounded by the filter material of the filter element and of the filter insert and contains the filtered raw gas before it flows out of the opening.

It is also advantageous if the filter material of the filter element and/or of the filter insert is folded in a star shape, i.e. if a cross-section of the filter element and/or of the filter insert is star-shaped, as this increases the filter surface area, which has a positive effect on the filter result.

The object of the invention is also achieved by a filter system for removing impurities from a stream of raw gas to be filtered, wherein the filter system has a housing in which at least one filter cartridge according to the invention is arranged, a compressed air tank which has at least one nozzle and is designed to eject the stream of compressed air for impinging on the filter material.

It is particularly advantageous if the compressed air tank is designed to discharge a stream of compressed air with a pressure of 4 to 8 bar. Thus, a good cleaning result can be achieved.

The outer shape of the cap of the filter cartridge according to the invention is especially matched both to the outer diameter of the interior space, i.e. to the inner diameter of the filter cartridge, and to the distance between the nozzle and the filter cartridge, i.e. the stream of compressed air is expanded by the cap in such a way that the entire filter material is hit by the stream of compressed air and any resulting energy loss is kept small. The outer shape of the cap therefore depends both on the dimensions of the filter cartridge, in particular on an outer diameter, and on a distance between the nozzle from which the stream of compressed air is ejected and the filter cartridge, and also depends on the flow velocity of the stream of compressed air or the energy of the stream of compressed air.

The distance in axial direction between the nozzle and the filter cartridge can be reduced by the cap, since the opening angle of the free jet is increased and thus also the filter medium/filter material at the filter cartridge inlet, i.e. in the upper part of the filter cartridge, is cleaned.

It is particularly advantageous if the nozzle is designed in such a way that the stream of compressed air emerges from the nozzle at high speed to supersonic speed. It is particularly advantageous if the nozzle is designed as a Laval nozzle.

It is also useful if the axial distance in the axial direction between the nozzle and the filter cartridge is smaller than three times the outer diameter of the interior space of the filter cartridge, preferably smaller than twice the outer diameter of the interior space of the filter cartridge, preferably smaller than 1.5 times the outer diameter of the interior space of the filter cartridge. This means in particular that the installation space of the entire filter system can be kept to a minimum in the axial direction.

It is also advisable if the filter cartridge is arranged in horizontal direction or preferably in vertical direction. This means that the axial direction of the filter cartridge corresponds to a horizontal direction or to a vertical direction/gravity direction. Especially with a vertical arrangement of the filter cartridge, the dust can fall downwards during cleaning in the direction of gravity without depositing on the filter element again.

A favorable exemplary embodiment is distinguished in that several filter cartridges are arranged in the filter system, thus the filter performance of the entire filter system can be increased.

It is also advantageous if an axial length of the filter insert is less than an axial length of the filter element. In other words, the filter insert is located completely inside the filter element. This means that it does not protrude beyond the axial length of the filter element, especially in the axial direction. This also means that the filter insert can have at most the same axial length as the axial length of the filter element.

The invention also concerns a method for cleaning a filter cartridge according to the invention, which is preferably located in a filter system according to the invention. The process involves the steps of first ejecting a stream of compressed air from a nozzle, which then flows against the cap of the filter cartridge and is widened by the outer shape of the cap such that it hits the entire filter material of the filter element.

According to another aspect of the invention, which is independent of the above embodiments but can preferably also be combined with features of the above embodiments, the invention concerns a filter cartridge for removing impurities from a stream of raw gas to be filtered, comprising a cylindrical filter element which is made of the filter material and in which a filter insert made of filter material is inserted, an annular interior space being formed between the filter element and the filter insert, for example, the filter material being adapted to be cleaned when a stream of compressed air is applied against a flow direction of the stream of raw gas, a base body of a flow guiding device having a surface adapted to direct the stream of compressed air being provided, the base body having a distal end region prepared to be completed by an end piece which is intended for directing the stream of compressed air, is separate from the filter cartridge and can be attached to an external housing.

In other words, the invention concerns a filter cartridge for removing impurities from a stream of raw gas to be filtered, comprising a cylindrical filter element which is made of filter material and in which a filter insert of filter material is inserted, an interior space being formed between the filter element and the filter insert, wherein the filter material is adapted to be cleaned when subjected to a stream of compressed air against a flow direction of the stream of raw gas, wherein a flow guiding device portion is provided which, for directing the flow, is completed by another flow guiding device portion which is not part of the filter cartridge. This means that the flow guiding device portion of the filter cartridge is incomplete. This also means that the flow guiding device portion of the filter cartridge is designed and arranged in such a manner that it conducts the stream of compressed air, i.e. fulfills the function of directing the stream of compressed air (only) in cooperation with the other flow guiding device portion.

The base body is the flow guiding device portion that is attached to the filter cartridge, i.e. it is part of the filter cartridge. The end piece is the other flow guiding device portion that is not attached to the filter cartridge but to an external housing. In combination, the base body and the end piece fulfill the function of the flow guiding device for guiding the stream of compressed air.

The advantage of this is that the two-part design of the flow guiding device allows a filter cartridge to be replaced, with one part (namely the end piece) remaining in the housing. This allows the filter cartridge e.g. to be pulled out in horizontal direction (e.g. via holding rails), since a part of the flow guiding device protruding in axial direction from the filter cartridge, i.e. the end piece, remains in the housing and thus the filter cartridge ends/terminates flush with an axial end of the filter element. In addition, it is advantageously possible that only the base body of the flow guiding device needs to be replaced and that the end piece can be reused, which has a favorable effect on the production costs of the (replacement) filter cartridge and facilitates the replacement of the filter cartridge.

In addition, it is advisable for the surface of the base body, in particular a radial outer surface, to be shaped and arranged in such a way that it merges seamlessly and/or continuously and/or in conformity with the gradient and/or in conformity with the curvature into an outer surface, in particular a radial outer surface of the end piece. In this context, "in conformity with the gradient" means that the gradient of the surface of the base body and the gradient of the outer surface of the end piece at the point of transition (of the (outer) surfaces) are identical. Further, "in conformity with the curvature" means that the curvature of the surface of the base body and the curvature of the outer surface of the end piece at the point of transition (of the (outer) surfaces) are identical same. This enables the flow of compressed air to be guided along the surfaces with minimal energy loss.

Furthermore, it is advantageous if the transition of the surface of the base body into the outer surface of the end piece is such that the flow of compressed air during cleaning is in contact with a total surface of base body and end piece in order to reach at least 80%, preferably more than 90%, further preferably more than 95%, especially preferably 100% of the filter material of the filter element in the case of cleaning. Thus, the base body and the end piece are in contact such that their surfaces form an overall surface along which the flow of the stream of compressed air is guided and thus expanded so that the flow hits the filter material.

Furthermore, it is preferred if (only) the base body, i.e. only a portion or part of the flow guiding device, is attached to the filter material, for example to the filter insert. This means, conversely, that at least part of the flow guiding device, namely the end piece, is not attached to the filter material and/or not to the filter cartridge. This reduces the number of components to be replaced when replacing a filter cartridge. In addition, the filter area is increased because the filter insert is extended.

Another function fulfilled by the flow guiding device is to ground the filter cartridge by means of the housing. This is particularly necessary and safety-relevant with explosive dusts when using antistatic filter material. For this purpose, the filter material is electrically conductively connected to the cap half on the filter cartridge, i.e. to the base body. The housing is electrically connected to the cap tip/end piece located in the filter housing.

When the filter cartridge is installed, an electrical contact is made between the two cap pieces, i.e. between the base body and the end piece, for example via a spring or a positive fit, and any electrical voltage can flow from the filter cartridge into the housing.

The same mechanism can ensure that—when mounting the filter cartridge and joining the cap pieces by closing the electrical circuit—only those filter cartridges are used which are correct for the intended application.

Alternatively, an RFID technology, which is installed as transmitter and receiver in the end piece and the base body of the flow guiding device, can also be used to block the system in the event of incorrect loading.

The filter cartridge can be grounded via the flow guide device via an electrical contact at the separation point.

Furthermore, it is advantageous if electrically conductive elements are present in the base body for grounding, which are designed in such a way that the filter cartridge is grounded with respect to the housing. It is particularly advantageous if the electrically conductive elements are designed as resilient contact electrodes. Alternatively, it is possible to provide form-fitting elements such as plugs or a profiling in the contact area/contact surface contacting the end piece.

It is also useful if the base body has a receiver or transmitter with RFID technology for checking a suitable filter cartridge and/or for checking the positioning of the filter cartridge. This makes it easy to check whether a suitable filter cartridge has been inserted into the filter system and/or whether the filter cartridge is positioned correctly. The receiver or transmitter of the base body is designed to communicate with a corresponding transmitter or receiver in the end piece. Alternatively, the check can also be carried out by closing an electrical circuit and/or by a mechanical positive fit when the base body is pressed against the end piece or when the filter cartridge is pressed against the filter housing.

The split base body performs additional functions via its contact surface, such as grounding the filter element or filter cartridge with respect to the filter housing, checking the positioning of the filter cartridge in the housing, ensuring and checking the presence of the correct filter cartridge in the filter housing, for example mechanically, via RFID technology and/or electrically.

It is also advantageous if a circumferential edge of a first axial end face (at a first axial end) of the base body, preferably completely, lies in a plane in which an axial end face of the filter element is arranged. This ensures in an advantageous way that the filter cartridge ends/terminates flush with the axial end face of the filter element in the axial direction so that no components of the filter cartridge protrude out of the filter element in the axial direction.

In addition, it is advisable if the circumferential edge of the base body has the form of a circle. This allows the flow to be expanded evenly in the radial direction.

In addition, it is advantageous if the base body is designed as a truncated cone or as a parabolic cone. This allows the base body to expand the flow of compressed air, which impinges on the base body in the axial direction, along its surface with particularly low energy loss.

It is also advantageous if an outer diameter of the base body increases from the first axial end face of the base body to a second axial end face of the base body opposite the first axial end face. In this way, a flow of compressed air can advantageously be directed radially outwards along the surface of the base body, i.e. can be expanded.

It is particularly preferred if the gradient of the outside diameter of the base body decreases from the first axial end face to the second axial end face of the base body. This ensures that the stream of compressed air is expanded more strongly first and, as the axial length increases, is directed outwards more gently, i.e. less strongly.

In addition, it is advantageous if the base body is hollow-walled or is formed as a solid body. This means that it is particularly important how the surface of the base body is shaped.

Furthermore, it is advisable if the first axial end surface of the base body is flat or concave. This means that the base body does not protrude from the filter element in the axial direction, but is flush with the axial end face of the filter element or curved inwards.

The object of the invention is also achieved by a kit consisting of an end piece and a filter cartridge according to the invention for removing impurities from a stream of raw gas to be filtered, whereby the filter cartridge is a cylindrical filter element which is made of filter material and in which a filter insert made of filter material is inserted, wherein an interior space is formed between the filter element and the filter insert, wherein the filter material is designed to be cleaned when subjected to a stream of compressed air against a flow direction of the stream of raw gas, and has a base body, wherein the base body forms a flow guiding device for guiding the stream of compressed air in cooperation with the end piece.

Furthermore, the object of the invention is also achieved by a filter system for removing impurities from a stream of raw gas to be filtered, comprising a housing in which at least one filter cartridge according to the invention is arranged, and comprising an end piece which is fastened to the housing, wherein an axial end face of the end piece is arranged so as to face a first axial end face of the base body of the filter cartridge.

Preferably, the filter system has a compressed air tank which has at least one nozzle and is designed to discharge the stream of compressed air to impinge on the filter material.

In addition, it is advantageous if the circumferential edge of the first axial end face of the base body has the form of a circle whose outer diameter corresponds to the outer diameter of a circumferential edge of an axial end face of the end piece.

It is particularly preferred if the end piece has the shape of a parabola rotated around the longitudinal axis. It is particularly preferred if the end piece and the base body together have the shape of a parabola rotated about the longitudinal axis, whereby the end piece is an upper part of the parabola body and the base body is a lower part of the parabola body.

Furthermore, it is preferred if the first axial end face of the base body lies against the axial end face of the end piece. Thus, a common body is formed which represents the flow guiding device.

In addition, it is advantageous if the end piece and the base body are arranged in such a way that an outer shape of the end piece merges continuously into an outer shape of the base body.

The object of the invention is also achieved by a method for cleaning a filter cartridge according to the invention, preferably in such a filter system, whereby a stream of compressed air is ejected from a nozzle of a compressed air tank of the filter system, which then flows against the flow guiding device, which comprises the base body and the end piece, and is expanded by the outer shape of the flow guiding device such that it hits at least 80%, preferably more than 90%, further preferably more than 95%, especially preferred 100% of the filter material of the filter element.

BRIEF DESCRIPTION OF THE DRAWINGS

The invention is explained below with the aid of drawings in which:

FIG. 1 is a schematic longitudinal section view of a filter cartridge according to the invention in a first, not claimed exemplary embodiment comprising a conical filter insert, a cylindrical filter element and a flow guiding device arranged inside the filter cartridge, FIG. 2 is a schematic longitudinal section view of the filter cartridge in a second exemplary embodiment not claimed, FIG. 3 is a schematic longitudinal section view of the filter cartridge in a third exemplary embodiment, in which the flow guiding device is arranged partly inside the filter cartridge and partly outside the filter cartridge, FIG. 4 is a schematic longitudinal section view of the filter cartridge in a fourth, not claimed exemplary embodiment comprising the cylindrical filter element and a cylindrical filter insert.

The figures are only schematic in nature and serve exclusively for the understanding of the invention. Identical elements are provided with the same reference symbols. The characteristics of the different exemplary embodiments can be interchanged.

DETAILED DESCRIPTION

Figure 5:
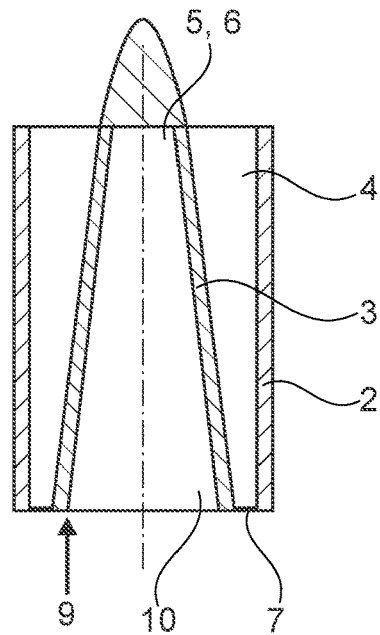
FIG. 5 is a schematic longitudinal section view of the filter cartridge in a fifth exemplary embodiment, in which the flow guiding device is arranged completely outside the filter cartridge.

FIG. 1 shows a filter cartridge 1 for removing impurities from a stream of raw gas to be filtered. Filter cartridge 1 has a cylindrical filter element 2, filter element 2 being made of the filter material. A filter insert 3 is inserted in the cylindrical filter element 2, with the filter insert also being made of the filter material. The filter element 2 and the filter insert 3 are arranged coaxially to each other. Inside the filter cartridge 1, an interior space 4 is formed, which is ring-shaped in the area between the filter element 2 and the filter insert 3. The filter material of the filter element 2 and filter insert 3 is designed in such a way that it is cleaned when subjected to a stream of compressed air which flows against a flow direction of the stream of raw gas. The filter cartridge 1 has a cap 6 which is designed as a flow guiding device 5 and is arranged and designed with respect to its external shape in such a way that the stream of compressed air is expanded by the cap 6 such that the entire filter material of the filter element 2 is hit by the stream of compressed air and any resulting energy loss is kept small.

In the first exemplary embodiment of FIG. 1, the cap 6 is arranged to be completely inside the filter cartridge 1. The cap 6 is attached to the filter insert 3. The cap 6 has a parabolic cross-section, i.e. the cap 6 corresponds to a parabola rotating around the longitudinal axis.

A filter bottom/annular component 7 is arranged between the filter element 2 and the filter insert 3 at a lower end of the filter cartridge 1 in the drawings, which connects the filter element 2 and the filter insert 3. A direction leading from top to bottom in the drawings is hereinafter referred to as a first axial direction 8, whereas a direction opposite to the first axial direction is referred to as a second axial direction 9. The annular component/filter bottom 7 is formed to be impermeable to air so that the stream of raw gas outside the filter cartridge 1 can pass through the filter material of the filter element 2 either from the outside to the inside or from an inner area 10, which is arranged radially inside the filter insert 3, to the outside through the filter material of the filter insert 3 and into the inner space 4. The flow path of the stream of raw gas is indicated in FIG. 1 with arrows.

During the filter operation of the filter cartridge 1, the stream of raw gas flows into the interior space 4 of the filter cartridge 1. For cleaning the filter cartridge 1, the supply of the stream of raw gas is interrupted and compressed air is applied to the filter material of the filter cartridge 1 in filter operation against the direction of flow. This means that a stream of compressed air in the manner of a compressed air blast flows in the direction of the first axial direction 8 and hits the filter cartridge 1, in the drawings from above. The cap 6 directs the stream of compressed air into the annular part of the interior space 4 so that it flows from inside to outside through the filter material of the filter element 2 and from outside to inside through the filter material of the filter insert 3 into the inner region 10 and removes particles such as dust trapped in the filter material. The removed particles then fall down in the direction of gravity and are collected in a dust collection container (not shown) and discharged.

In the filter cartridge 1 in FIG. 1, the filter insert 3 is conical. At its end facing the first axial direction 8, i.e. a first axial end, the filter insert 3 has a smaller outer diameter than at its second axial end opposite the first axial end. In the exemplary embodiment shown, the outer diameter increases linearly from the first axial end to the second axial end, but it may also increase in non-linear fashion, so that a radial outer surface of the filter insert 3 is curved, for example. The cap 6 is arranged on the first axial end of the filter insert 3.

In the area of a contact surface between the filter insert 3 and the cap 6, the outer diameter of the cap 6 continues smoothly into the outer diameter of the filter insert 3. This means that the outer diameter of the filter insert 3 at its first axial end corresponds to the outer diameter of the cap 6 at the end of the cap 6 facing the second axial direction 9, i.e. the second axial end. The outer diameter of the cap 6 increases from its first axial end, which is opposite the second axial end, to its second axial end. In the exemplary embodiment shown, the outer diameter increases to a greater extent starting from the first axial end of the cap, but decreases with increasing axial length of the cap 6. This means that the gradient of the outer diameter of the cap 6 decreases in the axial direction (from the first axial end to the second axial end).

In the exemplary embodiment shown, the cap 6 is arranged completely inside the interior space 4 of the filter cartridge 1, i.e. in the axial direction, the cap 6 does not extend up to the end of the filter cartridge 1 facing the first axial direction 8, the first axial end, and thus not up to the filter element 2. The interior space 4 of the filter cartridge 1 thus has a circular cross-section in the upper part of the filter cartridge 1, which merges into an annular cross-section through the cap 6.

The filter cartridge 1 in FIG. 2 differs from filter cartridge 1 in FIG. 1 in that the cap 6 extends in the axial direction up to the first axial end of the filter cartridge 1. The interior space 4 thus has an annular cross-section over the entire axial length of the filter element 2 and thus of the filter cartridge 1.

The filter cartridge 1 in FIG. 3 differs from the filter cartridge 1 in FIG. 1 or FIG. 2 in that the cap 6 extends in the axial direction beyond the first axial end of the filter cartridge 1. Thus, the cap 6 protrudes in the axial direction from filter element 2. The interior space 4 has an annular cross-section over the entire axial length of the filter element 2 and thus of the filter cartridge 1.

In the filter cartridge 1 in FIG. 4, the filter insert 3 is cylindrical. This means that the filter insert 3 has a constant outer diameter over its entire axial length. Thus, the interior space 4 in the area of the axial length of the filter insert 3 is designed as an annular interior space 4 with a constant annular cross-section. In the exemplary embodiment shown in FIG. 4, the cap 6 is arranged to be completely inside the interior space 4 of the filter cartridge 1, i.e. the cap 6 does not extend in the axial direction up to the first axial end of the filter cartridge 1 and thus of the filter element 2. The interior space 4 of the filter cartridge 1 has a circular cross-section in the upper part of the filter cartridge 1, which merges into an annular cross-section through the cap 6.

The filter cartridge 1 in FIG. 5 differs from the filter cartridge 1 in FIG. 3 in that the cap 6 is arranged so as to lie completely outside the filter cartridge 1. The cap 6 does not protrude into the filter element 2 in the axial direction. In the exemplary embodiment shown in FIG. 5, the cap 6 is flush with an axial end face of the filter cartridge 1, i.e. the cap 6 adjoins the filter cartridge 1 in the axial direction. The filter bottom 7 is designed as a pan in which the filter element 2 and the filter insert 3 are sealed and connected via a potting compound.

Figure 6:
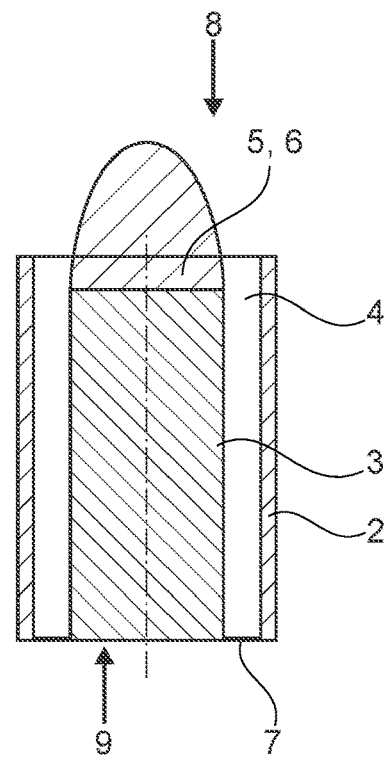
FIG. 6 is a schematic longitudinal section view of the filter cartridge in a sixth exemplary embodiment comprising the cylindrical filter element and a cylindrical filter insert made of an air-impermeable material, which serves as a displacement body.

The filter cartridge 1 in FIG. 6 differs from the filter cartridge 1 in FIG. 4 in that the filter insert 3 is designed so as to be impermeable to air and serves as a displacement body. The filter insert 3 can be designed as a solid body as shown in FIG. 6, or as a hollow body or like a shell (which is not shown). The cleaning result is improved by the filter insert 3 designed as a displacement body, as the stream of compressed air can only escape through the filter element 2.

Figure 7:
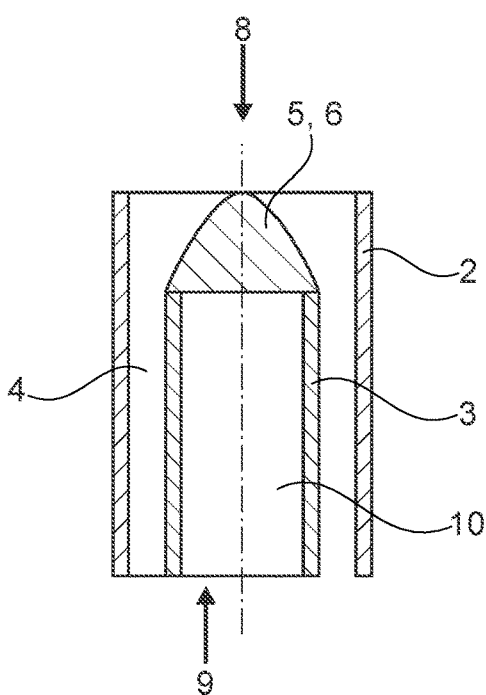
FIG. 7 is a schematic longitudinal section view of the filter cartridge in a seventh exemplary embodiment not claimed.

The filter cartridge 1 in FIG. 7 differs from the filter cartridge 1 in FIG. 4 in that the cap 6 extends in the axial direction up to the first axial end of the filter cartridge 1. The interior space 4 thus has an annular cross-section over the entire axial length of the filter element 2 and thus of the filter cartridge 1. The inner diameter of the annular cross-section increases from the first axial end of the filter cartridge 1 to the first axial end of the filter insert 3 depending on the outer shape of the cap 6. From the first axial end of the filter insert 3 to the second axial end of the filter cartridge 1, the annular cross-section is constant.

Figure 8:
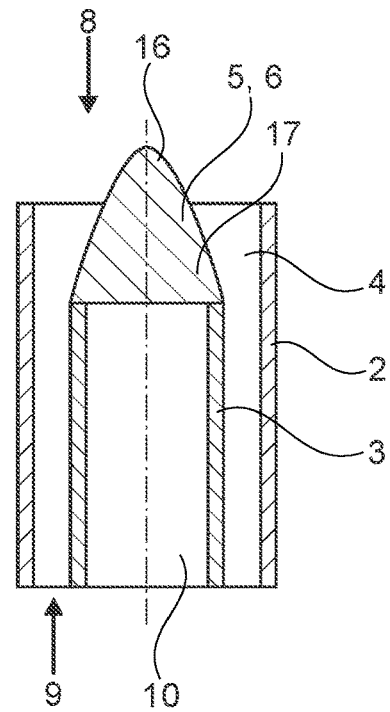
FIG. 8 is a schematic longitudinal section view of the filter cartridge in an eighth exemplary embodiment, in which the flow guiding device is arranged partly inside the filter cartridge and partly outside the filter cartridge.

In the filter cartridge 1 in FIG. 8, the cap 6 is arranged such that a first portion of the cap 6, which comprises the first axial end of the cap 6, projects out of the filter element 2 in the axial direction and another, second portion of the cap 6, which comprises the second axial end of the cap 6, is arranged inside the filter element 2. The first portion and the second portion may be designed to be separate or also integral. This will be explained in more detail later.

Figure 9:
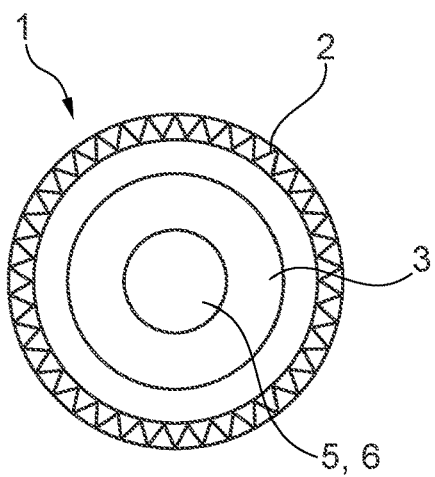
FIG. 9 is a schematic cross-sectional view of the filter cartridge comprising the conical filter insert.
Figure 10:
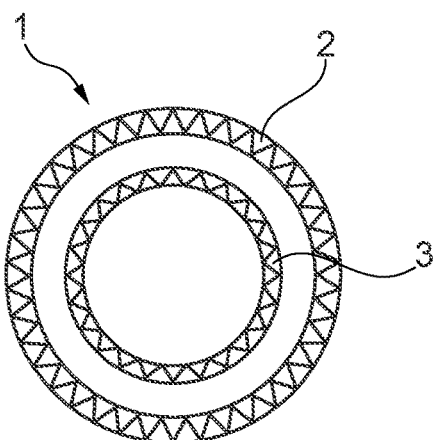
FIG. 10 is a schematic cross-sectional view, taken in the axial area of the filter insert, of the filter cartridge comprising the cylindrical filter insert made of the filter material.
Figure 12:
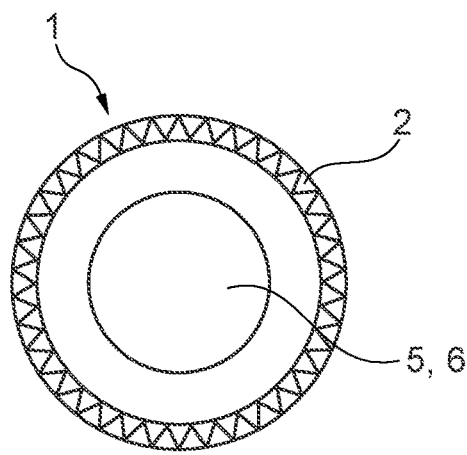
FIG. 12 is a schematic cross-sectional view of the filter cartridge.

FIGS. 9, 10 and 12 show a cross-section of the filter cartridge 1. The filter element 2, the filter insert 3 and the cap 6 are arranged coaxial to each other. The filter element 3 and the cap 6 are arranged one above the other in the axial direction, whereas the filter element 2 is arranged at the same axial height as the filter element 3 and the cap 6. The cross-section shown in FIG. 9 is taken in the axial area of the cap 6. The filter element 2 has a larger outer diameter than the filter element 3 and the cap 6. The filter element 3 has a larger outer diameter than the cap 6. The filter element 2 is made of a filter material folded in a zigzag pattern so that filter element 2 has a star-shaped cross-section. The filter insert 3 is also made of zigzag folded filter material, which can be seen in FIG. 10 which represents a cross-section taken in the axial area of the filter insert 3. FIG. 12 also shows a cross-section of the filter cartridge 1 which is taken in the axial area of the cap 6, but at a different axial position than in FIG. 9. This shows that the cross-section of the cap 6 varies over the axial direction, while the cross-section of the filter element 2 is constant over the entire axial length.

FIG. 11 shows a schematic representation of the cap 6, which has a parabolic or root shape. The cap 6 is rotationally symmetrical. Each longitudinal section through the axis of the cap 6 is identical and parabolic. The outer shape of the cap 6 increases in outer diameter from the first axial end to the second axial end. The cap 6 has an egg-shaped, i.e. round tip at the first axial end. The outer shape of the cap 6 is curved, with the largest curvature at the first axial end. The curvature decreases in the axial direction from the first axial end to the second axial end of the cap 6. The outer shape of the cap 6 essentially follows the function $f(x)=x^{1/2}$ or a similar parabola function. The cap 6 may be designed as a full body or a hollow body, i.e. shell-like. The outer shape of the cap 6 is designed in such a way that in the event of a vertical inflow, i.e. an inflow from the first axial direction 8, it widens the inflow with particularly little energy loss. In particular, the outer shape of the cap 6 is optimized for an inflow in the range of high speeds up to and above the speed of sound. The cap 6 has a flat axial outer surface at the second axial end, which is arranged perpendicular to the axis of the cap 6.

Figure 13:
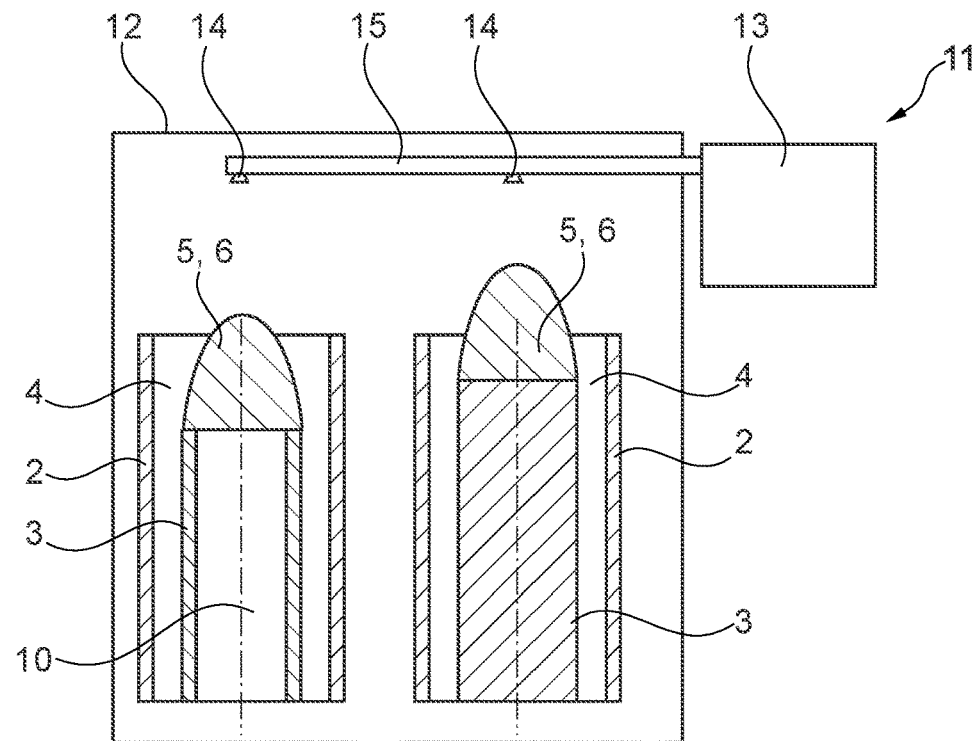
FIG. 13 is a schematic longitudinal section view of a filter system according to the invention.
Figure 14:
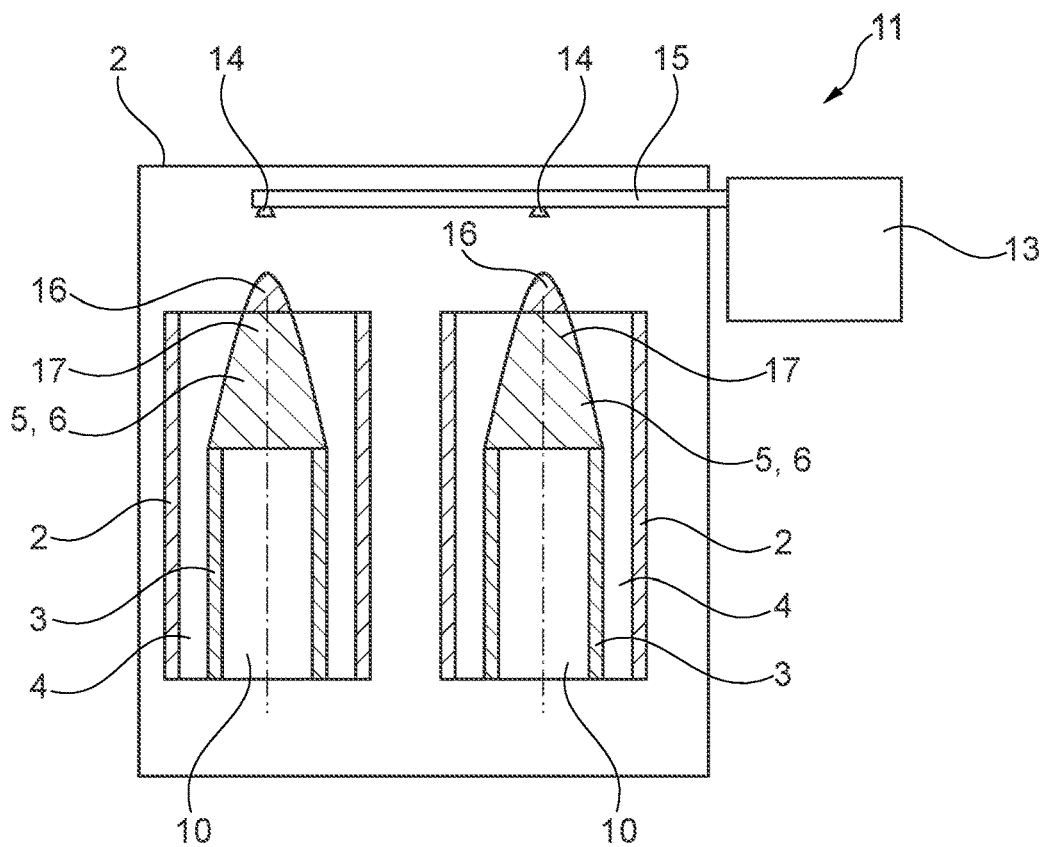
FIG. 14 is a schematic longitudinal section view of the filter system in a second exemplary embodiment.

FIGS. 13 and 14 show a filter system 11 according to the invention. The filter system 11 has a housing 12 in which two filter cartridges 1 are arranged. The filter cartridges 1 can be inserted into the housing 12 via holding rails which are not shown. In FIG. 13, the filter cartridges 1 according to the exemplary embodiment of FIG. 4 are inserted, and in FIG. 14 the filter cartridges 1 according to the exemplary embodiment from FIG. 8 are inserted. However, the invention is not limited to a filter system 11 with the filter cartridges 1 shown in FIGS. 13 and 14.

The filter system 11 has a compressed air tank 13, which is arranged either within the housing 12 or outside the housing 12. The compressed air tank 13 is designed to discharge compressed air, preferably at a pressure of 4 to 8 bar, through nozzles 14 which are located above the filter cartridges 1. The compressed air tank 13 and the nozzles 14 are connected via a pipe/blowpipe 15 to transfer the compressed air. For each filter cartridge 1, there is one nozzle 14 which is arranged on the axis of the filter cartridge 1, but spaced apart in the axial direction.

The outer shape of the cap 6 is matched both to the distance between the nozzle 14 and the first axial end of the cap 6 or the first axial end of the filter cartridge 1 and to the size of the inner chamber 4, in particular an outer diameter of the inner chamber 4, i.e. an inner diameter of the filter element 2, so that the stream of compressed air is directed to the filter material to be cleaned.

In the exemplary embodiment shown in FIG. 14, the cap 6 is designed in such a way that a first portion 16/an end piece 16 projects out of the filter element 2 in the axial direction and a second portion 17/a base body 17 is arranged within filter element 2. This expands the stream of compressed air in the axial direction already at a point closer to the nozzle 14, so that an axial distance between the nozzle and the filter cartridge 1 can be reduced.

Figure 11A:
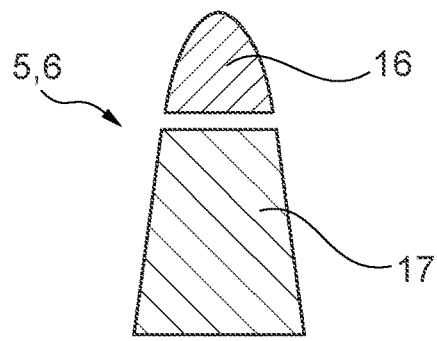
FIG. 11a is a schematic longitudinal section view of a divided flow guiding device.
Figure 11B:
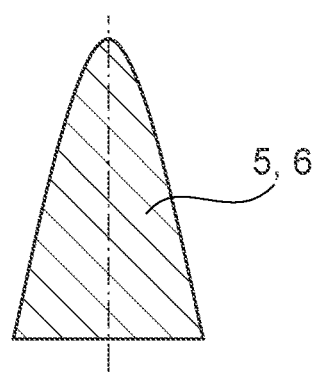
FIG. 11b is a schematic longitudinal section view of the flow guiding device.

The first portion 16 and the second portion 17 of the cap 6 are integral (cf. FIGS. 11*b* and 13) or separate (cf. FIGS. 11*a* and 14).

In a separate design, the first portion/end piece 16 of the cap 6 is firmly connected to the housing 12 and the second portion/base body 17 of the cap 6 is firmly connected to the filter cartridge 1. The portions 16, 17 do not have to be connected in the case of the separate design. It is sufficient if the two portions 16, 17 are arranged so as to adjoin each other or so that there is a small gap between the two portions 16, 17, which for instance is smaller than a wall thickness of the filter element 2. The second portion 17 thus has the shape of a parabolic stump. If a filter cartridge 1 is replaced in a filter system 11 from FIG. 14, the first portion 16 of the cap 6 remains in the housing 12.

The second portion 17 of the cap 6 has a flat axial outer surface at its first axial end, which faces the first axial direction 8. The (first) axial outer surface/end surface is circular and has the same outer diameter as an axial outer surface/end surface of the first portion 16. An axial outer edge/circular edge of the axial end surface of the second portion 17 of the cap 6 is completely in a plane in which an axial end surface of the filter element 2 is also arranged. This means that the second portion 17 of the cap 6 is flush with the filter element 2 in the axial direction. The outer diameter of the second portion 17 of the cap 6 increases from the first axial end of the second portion 17 to the second axial end of the second portion 17. The radial outer surfaces of the second portion 17 are preferably slightly curved outwards or linear/even/straight.

LIST OF REFERENCE SYMBOLS

1 filter cartridge
2 filter element
3 filter insert
4 interior space
5 flow guiding device
6 cap
7 annular component/filter bottom
8 first axial direction
9 second axial direction
10 inner region
11 filter system
12 housing
13 compressed air tank
14 nozzle
15 pipe
16 first portion/end piece
17 second portion/base body

We claim:

1. A filter cartridge for removing impurities from a stream of raw gas to be filtered, comprising a cylindrical filter element which is made of a filter material and in which a filter insert is inserted, an interior space being formed between the filter element and the filter insert, the filter material being designed to be cleaned when a stream of compressed air is applied against a flow direction of the stream of raw gas, a cap designed as a flow guiding device being provided for guiding the stream of compressed air, wherein the cap is arranged such that it projects beyond an axial length of the filter element in the axial direction, a first portion of the cap being arranged outside the filter element in the axial direction and a second portion of the cap being arranged inside the filter element, the first portion of the cap having an axial length in the axial direction which is 0.5 to 1.0 times as large as an inner diameter of the filter element.

2. The filter cartridge according to claim 1, wherein a first axial end of the cap is arranged outside the filter element in the axial direction.

3. The filter cartridge according to claim 2, wherein an outer diameter of the cap increases from the first axial end of the cap to a second axial end of the cap opposite the first axial end of the cap.

4. A method for cleaning a filter cartridge according claim 1, wherein a stream of compressed air is ejected from a nozzle which then flows against the cap of the filter cartridge and is expanded by the outer shape of the cap such that it hits the entire filter material of the filter element.

5. The filter cartridge according to claim 1, an outer shape of the cap following a parabolic function or a root function.

6. The filter cartridge according to claim 5, a gradient of the parabolic function following the outer shape of the cap decreasing in the axial direction from the first axial end to the second axial end.

7. The filter cartridge according to claim 5, a radial outer surface of the first portion being shaped and arranged in such a way that it merges seamlessly and/or continuously and/or in conformity with the gradient and/or in conformity with the curvature into a radial outer surface of the second portion.

8. The filter cartridge according to claim 6, a radial outer surface of the first portion being shaped and arranged in such a way that it merges seamlessly and/or continuously and/or in conformity with the gradient and/or in conformity with the curvature into a radial outer surface of the second portion.

9. The filter cartridge according to claim 1, wherein the first portion of the cap has a greater axial length than the second portion of the cap.

10. A filter system for removing impurities from a stream of raw gas to be filtered, comprising a housing in which at least one filter cartridge according to claim 1 is arranged, and a compressed air tank which comprises at least one nozzle and is designed to eject the stream of compressed air from the nozzle for impinging the filter material.

11. The filter system according to claim 10, wherein a distance between the filter element and the nozzle is smaller than 2.0 times the size of the inner diameter of the filter element.

12. The filter system according to claim 10, wherein an outer shape of the cap is matched both to the distance between the cap and the nozzle and to the inner diameter of the filter element, so that the stream of compressed air is expanded such that the filter material of the filter element is hit by the stream of compressed air.

* * * * *